United States Patent
Rosker et al.

[11] Patent Number: 5,721,634
[45] Date of Patent: Feb. 24, 1998

[54] CESIUM-GERMANIUM HALIDE SALTS FORMING NONLINEAR OPTICAL CRYSTALS

[75] Inventors: Mark J. Rosker, Newbury Park; Patricia H. Cunningham, Thousand Oaks; Mark D. Ewbank, Newbury Park, all of Calif.; Peter Günter, Riedt-Neerach, Switzerland

[73] Assignee: Boeing North American, Inc., Seal Beach, Calif.

[21] Appl. No.: 729,219

[22] Filed: Oct. 9, 1996

[51] Int. Cl.$^6$ ........................ G02F 1/35
[52] U.S. Cl. .................. 359/326; 252/584
[58] Field of Search ............... 359/326–332; 385/122; 372/21, 22; 252/584, 587, 588

[56] References Cited

U.S. PATENT DOCUMENTS

| | | | |
|---|---|---|---|
| 3,949,323 | 4/1976 | Bierlein et al. | 359/326 |
| 4,370,258 | 1/1983 | Ogata et al. | 502/162 |
| 5,379,311 | 1/1995 | McFarlane et al. | 359/326 X |

*Primary Examiner*—John D. Lee
*Attorney, Agent, or Firm*—Steven E. Kahm

[57] ABSTRACT

A family of cesium-germanium halide salts have utility as nonlinear optical crystals in applications including electro-optics and optical frequency conversion. These salts have the general formula $CsGeCl_xBr_yI_z$, in which x, y, and z equal 0 through 3, inclusive, and where x+y+z=3. In contrast to well-known oxygen-containing materials, such as $LiNbO_3$, these cesium-germanium halide salts exhibit optical nonlinearity with an extremely wide transparency range (without significant absorption) at wavelengths from about 0.4 μm to greater than 25 μm (covering the entire MWIR and LWIR regions). Based on $Ge^{2+}$ ions, these halides have non-centrosymmetric perovskite structures. The halide ions form a strongly coordinating octahedral environment about the $Ge^{2+}$ ions and resist migration in an electric field. The Ge2+ ions, however, are shifted slightly off center in the tetragonal phase, leading to a net electric dipole moment in each unit cell. The alignment of these dipole moments into ferroelectric domains can be controlled through applied electric fields. By aligning all dipole moments into a single ferroelectric domain, these cesium-germanium halides have utility for electro-optic and birefringently phase-matched frequency conversion devices. Alternately, periodic poling of the ferroelectric domains allows these materials to be used for quasi-phase-matched frequency conversion. Cesium-germanium halide salts, which can be isolated from aqueous solutions as salts of $GeX_3^-$ anions, are water-soluble, which facilitates large-aperture crystal growth.

20 Claims, 1 Drawing Sheet

CESIUM-GERMANIUM HALIDE SALTS FORMING NONLINEAR OPTICAL CRYSTALS

TECHNICAL FIELD

The present invention relates to nonlinear optical systems and, in particular, to the use of cesium-germanium halide salt crystals as nonlinear optical materials.

BACKGROUND OF THE INVENTION

Electro-optic devices use crystals of nonlinear optical materials for functions including second harmonic generation, parametric amplification, sum and difference frequency generation, frequency tuning, and modulation of coherent electromagnetic radiation. Examples of such materials and their uses in the prior art are described in U.S. Pat. No. 3,949,323 issued to Bierlein et al., the teachings of which are incorporated herein by reference.

The increasing use of nonlinear optical systems in a wide range of applications has created a need for improvements in the performance characteristics of nonlinear optical materials. One such application involves remote sensing in the atmosphere by a technique known as Laser Identification and Ranging (LIDAR). A LIDAR system is capable of detecting the presence of a specific gas species and determining its concentration as a function of range at distances of kilometers. LIDAR requires an intense optical field at the precise characteristic wavelength(s) of absorption of the species to be detected. An optical parametric oscillator (OPO), a nonlinear optical device that converts the frequency of an intense laser source to a desired wavelength, is a widely used and frequency agile means for producing such an intense radiation field. An OPO, in addition to frequency conversion, allows precision tuning of the wavelength and restriction of the frequency bandwidth of the output radiation.

Important transmission regions in the atmosphere are located at the 3–5 μm and 8–12 μm wavelength bands. There are a variety of gas species of interest (such as ozone, for example) that have chemical signatures at wavelengths longer than 4 μm. However, with currently available nonlinear optical materials (which are listed in Table 1 below in order of their effective nonlinear coefficient, $d_{eff}$), frequency conversion of radiation to wavelengths longer than about 4.0 μm is very difficult, particularly with an optical pump at a wavelength of about 1 μm (such as generated by a commercially available Nd:YAG laser). This limitation is due to intrinsic properties of the available nonlinear optical materials. Most commonly, the long-wavelength limit results from the onset of significant absorption in the crystal. Other properties of the materials that can prevent or restrict conversion past 4 μm include strong absorption by the crystal at a convenient pump wavelength (such as 1.064 μm, for example), susceptibility to laser induced damage from the intense radiation field, and mechanical or chemical characteristics that hinder processing of the materials (such as softness, strong cleavage planes, loosely bonded waters of crystallization, or hygroscopic characteristics, for example). As a result, the usefulness of LIDAR systems is somewhat limited but would be improved greatly if there were a nonlinear optical material that could access these important spectral bands and survive the intense radiation fields.

TABLE 1

Common nonlinear materials for IR frequency conversion

| Crystal Material | $d_{eff} \times 10^{12}$ (m/V) | Transmission Range (μm) | Damage Threshold (MW/cm$^2$) |
|---|---|---|---|
| ZnGeP$_2$ | 75 | 0.7–12 | >4 |
| Tl$_3$AsSe$_3$ | 40 | 1.2–18 | 32 |
| AgGaSe$_2$ | 33 | 1.2–18 | >10 |
| AgGaS$_2$ | 12 | 0.6–13 | 12–25 |
| LiIO$_3$ | 7.5 | 0.31–5.5 | 125 |
| LiNbO$_3$ | 6.25 | 0.35–4.5 | 50–140 |
| KTiOPO$_4$ | 3.2 | 0.35–4.5 | 500 |

In a nonlinear optical medium, incident radiation generates electromagnetic fields at frequencies equal to the sum and the difference of the inputs. The nonlinear tensor and the direction of the polarizations of the radiation fields relative to the crystal determine the effective nonlinearity, $d_{eff}$, which is the coupling parameter that sets the magnitude of the energy exchange from the input to the newly generated frequency. One condition that must be rigorously upheld is the conservation of energy, which demands that the sum of the newly created output frequencies (or frequency) equal the sum of the input frequencies (or frequency).

Efficient conversion in a nonlinear optical material also requires the satisfaction of a second condition known as phase matching (PM). Any energy conserving combination of output wavelengths is characterized by a wavevector mismatch, $\Delta k$, which results from the difference in phase velocities of the radiation fields. After the radiation fields have traversed a length of the crystal known as the coherence length ($L_c$), which is equal to $\pi/\Delta k$, the output radiation field begins to destructively interfere with itself. This acts to severely limit the degree of energy exchange into the desired output wavelengths. The phase matching condition is satisfied by making $\Delta k \approx 0$, so that the coherence length of the material becomes larger than the physical size of the nonlinear crystal.

In the case of second harmonic generation (SHG), in which two photons of the same frequency ($\omega_0$) combine to give a photon of twice that frequency ($\omega_1 = 2\omega_0$), the phase matching condition can be satisfied by making the index of refraction at the output frequency equal to the index of refraction at the input frequency. Virtually all materials display so-called "normal" dispersion, wherein the refractive index increases with frequency in contradiction to this requirement. However, in a birefringent material the phase matching condition can be satisfied by a proper choice of the polarizations of the input and output radiation fields. In birefringent phase matching (BPM), frequency adjustment (or "tuning") of the radiation field can be accomplished by any external means that causes the refractive index to change, such as by physical rotation of the crystal relative to the direction of the input radiation.

One disadvantage of birefringent phase matching (BPM) is the phenomenon of "walk-off," in which the practical limitation on the length of the nonlinear interaction is set by double refraction in the birefringent material. This phenomenon led to the alternate technique of quasi-phase matching (QPM). In QPM, the nonlinearity of the material is modulated with a period exactly equal to (or an odd multiple of) the coherence length. For example, periodically poled LiNbO$_3$ is useful as a frequency conversion material because its structure permits extremely long interaction lengths. Periodic poling is a means by which the crystal, subsequent to its growth, can be divided eternally (typically by the application of an electric field) into domains having opposite (in sign) optical nonlinearities to accomplish QPM. Because a common polarization can be chosen, walkoff is avoided and the interaction length is determined by the periodic poling and the practical limits to which a single crystal of proper orientation can be grown. Thus, periodically poled $LiNbO_3$ provides efficient frequency conversion at low thresholds by making the physical structure sufficiently long.

A non-centrosymmetric crystal that is capable of second-order frequency conversion is necessarily an electro-optic material. Symmetry considerations dictate that any material having second-order nonlinear optical coefficients must also have non-zero electro-optic coefficients. Systems that use electro-optic modulation (such as Q-switches for pulsed laser systems, amplitude and phase modulators for communications systems, and filtering for spectral discrimination, for example) require materials with large electro-optic coefficients and extended transparency. The most common electro-optic materials, ferroelectric oxides (such as strontium barium niobate (SBN), for example) exhibit large electro-optic coefficients, but their transparency is unsuitable for applications at wavelengths longer than approximately 4 μm because they begin absorbing light as a result of metal-oxygen phonon modes. Because of the limitations of known materials and the demand for nonlinear optical systems capable of operation at longer wavelengths, there is a need for new nonlinear optical materials with improved performance in applications such as optical frequency conversion and electro-optics.

SUMMARY OF THE INVENTION

The present invention exploits a family of cesium-germanium (CsGe) halide salts whose crystals have been discovered to exhibit desirable nonlinear optical characteristics. These cesium-germanium halide salts, which are broadly transparent at infrared wavelengths, have particular utility as media for nonlinear optics, including electro-optics and optical frequency conversion.

Nonlinear optical devices of the present invention incorporate, as a nonlinear optical medium, a cesium-germanium halide salt, where the halogen is selected from chlorine (Cl), bromine (Br), iodine (I), and combinations thereof. The general formula for these salts is $CsGeCl_xBr_yI_z$, where $x+y+z=3$, and x, y, and z equal 0 through 3, inclusive. These cesium-germanium halide salts contain highly polarizable halides and are generally water-soluble, which facilitates as large-aperture crystal growth. The crystals have a non-centrosymmetric perovskite structure, with no characteristic stereochemically active lone electron pairs. The halide ions in these crystals form a strongly coordinating octahedral environment about the $Ge^{2+}$ ions and resist migration in an electric field. The Ge2+ ions, however, are shifted slightly off center in the tetragonal phase, leading to a net electric dipole moment in each unit cell. The alignment of these dipole moments into ferroelectric domains can be controlled through applied electric fields. By aligning all dipole moments into a single ferroelectric domain, these cesium-germanium halides are made more useful for electro-optic and birefringently phase-matched frequency conversion devices. Alternately, periodic poling of the ferroelectric domains allows these materials to be used for quasi-phase-matched frequency conversion applications. Because cesium-germanium halide salts do not contain oxygen, they exhibit an extremely wide transparency range (without significant absorption) at wavelengths from about 0.4 μm to greater than 25 μm (covering the entire mid-wave infrared (MWIR) and long-wave infrared (LWIR) regions).

A principal object of the invention is the use of a family of cesium-germanium halide salts as nonlinear optical crystals. A feature of the invention is the use of cesium-germanium halide salt crystals for electro-optics and optical frequency conversion. An advantage of the invention is a nonlinear optical medium having broad transparency in the MWIR and LWIR wavelength bands.

BRIEF DESCRIPTION OF THE DRAWINGS

For a more complete understanding of the present invention and for further advantages thereof, the following Detailed Description of the Preferred Embodiments makes reference to the accompanying Drawings, in which.

DETAILED DESCRIPTION OF THE PREFERRED EMBODIMENTS

The present invention exploits the utility of a family of cesium-germanium (CsGe) halide salts, whose crystals have been discovered to exhibit desirable nonlinear optical characteristics. These cesium-germanium halide salts, which do not contain oxygen and are broadly transparent at infrared wavelengths, have particular utility as media for electro-optics and optical frequency conversion.

Nonlinear optical materials of the present invention comprise crystals of cesium-germanium halide salts having the general formula $CsGeCl_xBr_yI_z$, in which x, y, and z equal 0 through 3, inclusive, and where $x+y+z=3$. For simplicity of notation with respect to the basic materials, $CsGeCl_3$ can be referred to as CGC, $CsGeBr_3$ as CGB, and $CsGeI_3$ as CGI. Cesium-germanium halide salts with partial substitution of ions, such as $CsGeBr_2Cl$ (as one example of the several possible variations), may be used to tailor the performance characteristics of these nonlinear optical materials.

Figure 1:
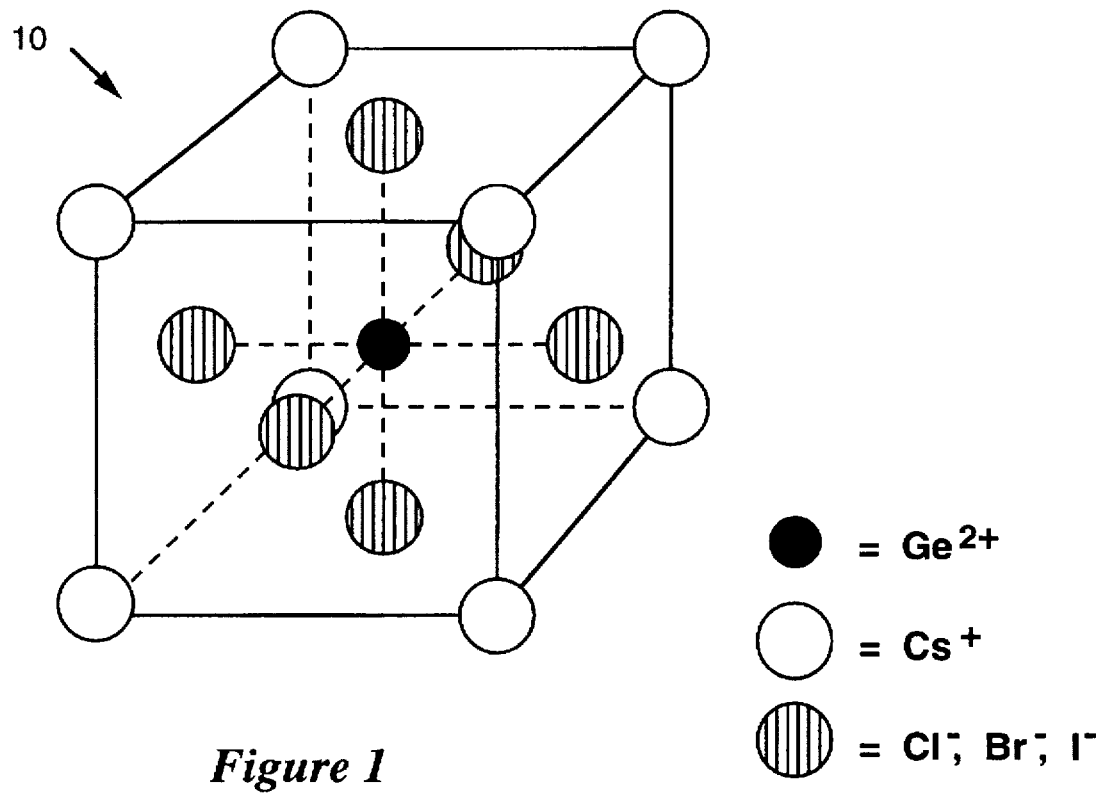
FIG. 1 is a diagram of a unit cell showing the crystal structure of a cesium-germanium halide salt of the present invention.

The cesium-germanium halide salts comprising this family of materials based on $Ge^{2+}$ ions have non-centrosymmetric perovskite structures, with no characteristic stereochemically active lone electron pairs. FIG. 1 is a diagram of a unit cell illustrating the crystal structure of the cesium-germanium halide salts. These salts can be isolated from aqueous solutions as salts of $GeX_3^-$ anions, which indicates strong complexing of the metal ions with the halides. In addition, they are water-soluble, facilitating large-aperture crystal growth. The structure and bonding characteristics of these systems are unusual, with CGI, for example, being intensely colored and semiconducting. The halide ions in these crystals form a strongly coordinating octahedral environment about the $Ge^{2+}$ ions and resist migration in an electric field. The $Ge^{2+}$ ions, however, are shifted slightly off center in the tetragonal phase (as in poled $BaTiO_3$), leading to a net electric dipole moment in each unit cell. The alignment of these dipole moments into ferroelectric domains can be controlled through applied electric fields. By aligning all dipole moments into a single ferroelectric domain, these cesium-germanium halides become more useful for electro-optic and birefringently phase-matched frequency conversion devices. Alternately, periodic poling of the ferroelectric domains allows these cesium-germanium halide materials to be used for quasi-phasematched (QPM) frequency conversion applications. All such devices operate throughout the mid-wave infrared (MWIR) and long-wave infrared (LWIR) regions due to the extended transparency of cesium-germanium halide materials.

Figure 2:
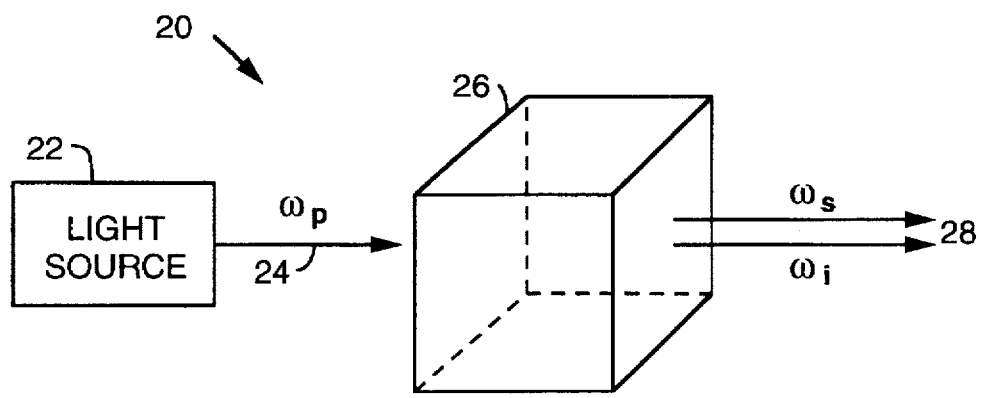
FIG. 2 is a schematic diagram of a nonlinear optical device including a light source, a pump beam having a frequency $\omega_p$, a nonlinear optical medium comprising a cesium-germanium halide salt crystal, and an output having a signal frequency $\omega_s$ and an idler frequency $\omega_i$.

FIG. 2 illustrates a nonlinear optical device 20 of the present invention. Device 20 includes a light source 22 which directs a light beam (pump) 24 having a frequency $\omega_p$ into a crystal 26 comprising a cesium-germanium halide salt. Crystal 26 converts input beam 24 into an output beam 28 having output frequencies $\omega_s$ and $\omega_i$ such that $\omega_p=\omega_s+\omega_i$, where $\omega_p$, $\omega_s$, and $\omega_i$ are the pump, signal, and idler frequencies, respectively. Nonlinear optical device 20 may include additional optical elements (not shown), such as lenses, mirrors, beam splitters, polarizers, etc., as are well known in the art. The phase matching condition can be satisfied by as either birefringent phase matching (BPM) or quasi-phase matching (QPM).

As described above, the cesium-germanium halide salts, including CGC, CGB, and CGI, are oxygen-free ferroelectrics. In contrast to well-known oxygen-containing ferroelectrics, such as LiNbO$_3$, these cesium-germanium halide salts exhibit optical nonlinearity with an extremely wide transparency range (without significant absorption) at wavelengths from about 0.4 μm to greater than 25 μm (covering the entire MWIR and LWIR regions). CsGeCl$_3$ (CGC) is moderately nonlinear and transparent (as measured) from 0.4 μm to 22 μm. CsGeBr$_3$ (CGB) is transparent from 0.55 μm to 25 μm and has a nonlinearity about two times greater than that of LiNbO$_3$ (a commonly used standard). CsGeI$_3$ (CGI) has an extraordinarily large optical nonlinearity, but it absorbs light in the near infrared. However, CGI has great utility for second harmonic generation (SHG) from a CO$_2$ laser pump (i.e., from 10 μm to 5 μm).

Direct phase-matched second-harmonic generation (DPM-SHG), which is known in the art, is a technique by which a prospective nonlinear material can be thoroughly evaluated. The purposes of DPM-SHG experiments are to measure all orientations at which the crystal phase matches the phase matching locus and, for each point on the locus, to measure the intensity of the second harmonic and the acceptance angle. DPM-SHG makes possible the determination of these critical nonlinear optical characteristics on a small single crystal. Standard optical crystallographic techniques are used to grind and mount a single crystal sphere on a goniometer for DPM-SHG.

DPM-SHG measurements were taken at 3.5 μm for a microsphere of CGC. Maximum second harmonic generation intensities (relative to LiNbO$_3$) of approximately 0.6 and 0.1 for Type I and II phase matching, respectively, were observed. In addition, a Type I DPM-SHG intensity more than eight times larger than that for an equal thickness of LiNbO$_3$ was observed in a single-crystal plate of CGB about 90 μm thick. In each case, the measured nonlinearity was relatively large compared to previously known infrared frequency conversion materials.

The observation of both Type I and Type II phase matching in these crystals indicates substantial birefringence and suggests that frequency tuning may be accomplished across the entire transparency range. Since no optical damage was observed during the DPM data collection, which uses fundamental pump intensities of about 50 MW/cm$^2$, the multiple-shot optical damage threshold in the infrared region must be reasonably large. Furthermore, the successful fabrication of polished microspheres of these cesium-germanium halide salts is strong evidence of adequate material hardness and processability.

Synthesis of Cesium-Germanium Halide Salt Crystals

As an example, CsGeX$_3$ salt crystals (where X comprises chlorine (Cl), bromine (Br), or iodine (I)) can be synthesized using one of at least two methods. In the first process, GeX$_4$ is dissolved in a 10–20% solution of hydrohalic acid in water. Approximately 2 moles of hypophosphorous acid is then added for every 1 mole of GeX$_4$. This solution is mixed at approximately 50° C. under GN$_2$ for about 1 day, and then 1 mole of CsX is added for each initial mole of GeX$_4$. CsGeX$_3$ salt comes out of solution as a white powder (CsGeCl$_3$), a yellow powder (CsGeBr$_3$), or a black powder (CsGeI$_3$). The CsGeX$_3$ powder can then be dissolved in a warm solution of 10–20% hydrohalic acid under GN$_2$. This solution can be either cooled or evaporated in GN$_2$ to grow CsGeX$_3$ salt crystals suitable for nonlinear optical applications.

In an alternate process, GeO$_2$ is dissolved in a 10–20% solution of hydrohalic acid in water. Approximately 2 moles of hypophosphorous acid is then added for every 1 mole of GeO$_2$. This solution is mixed at approximately 50° C. under GN$_2$ for about 2 days, and then 1 mole of CsX is added for each initial mole of GeO$_2$. CsGeX$_3$ salt comes out of solution as a white powder for (CsGeCl$_3$), a yellow powder (CsGeBr$_3$), or a black powder (CsGeI$_3$). The CsGeX$_3$ powder can then be dissolved in a warm solution of 10–20% hydrohalic acid under GN$_2$. Any unreacted GeO$_2$ can be filtered out after the CsGeX$_3$ salt has dissolved. The remaining solution can be either cooled or evaporated in GN$_2$ to grow CsGeX$_3$ salt crystals suitable for nonlinear optical applications.

EXAMPLE 1

CsGeCl$_3$

As an example of the first process specifically for synthesizing CsGeCl$_3$, 25 μm. of GeCl$_4$ is added to a solution of 150 ml. of concentrated HCl (37%) and 300 ml. of distilled water. Approximately 30 μm. of a 50% solution of hypophosphorous acid (H$_3$PO$_2$) is then added. This solution is mixed under GN$_2$ at 50° C. for several hours (e.g., overnight). Next, 19.63 gm. of CsCl in a 50 ml. solution of approximately 10% HCl is added. Mixing is continued at 50° C. under GN$_2$, and solid CsGeCl$_3$ precipitates from the solution while stirring. The CsGeCl$_3$ can be filtered from the solution under GN$_2$ as a flaky white solid. The solid CsGeCl$_3$ is then dissolved in a warm solution (50° C.) of 12% HCl under GN$_2$. Crystals of CsGeCl$_3$ form in the vessel as the solution is evaporated under GN$_2$.

EXAMPLE 2

CsGeBr$_3$

As an example of the first process specifically for synthesizing CsGeBr$_3$, 10 μm. of GeBr$_4$ is added to a solution of 150 ml. of concentrated HBr (48%) and 300 ml. of distilled water. Approximately 6.7 μm. of a 50% solution of hypophosphorous acid is then added. This solution is mixed under GN$_2$ at 50° C. for several hours (e.g., overnight). Next, a solution of 5.43 μm. of CsBr in 50 ml. of approximately 16% HBr is added. Mixing is continued at 50° C. under GN$_2$, and solid CsGeBr$_3$ precipitates from the solution while stirring. The CsGeBr$_3$ can be filtered from the solution under GN$_2$ as a yellow-orange solid. The solid CsGeBr$_3$ is then dissolved in a warm solution (50° C.) of 16% HBr in GN$_2$. Crystals of CsGeBr$_3$ form in the vessel as the solution is evaporated under GN$_2$.

Although the present invention has been described with respect to specific embodiments thereof, various changes and modifications can be carried out by those skilled in the art without departing from the scope of the invention. In particular, crystals of cesium-germanium halide salts of the present invention are useful in devices that utilize their nonlinear properties including second harmonic generation, frequency conversion (up as well as down), and parametric amplification. Therefore, it is intended that the present invention encompass such changes and modifications as fall within the scope of the appended claims.

We claim:

1. A nonlinear optical medium, comprising a crystal of a cesium-germanium halide salt having the general formula $CsGeCl_xBr_yI_z$, in which x, y, and z each equal a real number from 0 through 3 inclusive, and where $x+y+z=3$.

2. The nonlinear optical medium of claim 1, wherein said cesium-germanium halide salt crystal comprises $CsGeCl_3$.

3. The nonlinear optical medium of claim 1, wherein said cesium-germanium halide salt crystal comprises $CsGeBr_3$.

4. The nonlinear optical medium of claim 1, wherein said cesium-germanium halide salt crystal comprises $CsGeI_3$.

5. The nonlinear optical medium of claim 1, wherein said cesium-germanium halide salt crystal comprises a medium for receiving an input beam of electromagnetic radiation and generating an output beam of electromagnetic radiation.

6. The nonlinear optical medium of claim 5, wherein said cesium-germanium halide salt crystal forms an electro-optic medium.

7. The nonlinear optical medium of claim 5, wherein said cesium-germanium halide salt crystal forms an optical frequency conversion device.

8. The nonlinear optical medium of claim 5, wherein said cesium-germanium halide salt crystal is periodically poled to form a quasi-phase matched frequency conversion medium.

9. A nonlinear optical device, comprising:

a nonlinear optical medium consisting of a crystal of a cesium-germanium halide salt having the general formula $CsGeCl_xBr_yI_z$, in which x, y, and z each equal a real number from 0 through 3 inclusive, and where $x+y+z=3$;

means for generating and directing an input light beam into said cesium-germanium halide salt crystal; and said cesium-germanium halide salt crystal generating an output light beam.

10. The nonlinear optical device of claim 9, wherein said device comprises an electro-optic device.

11. The nonlinear optical device of claim 9, wherein said device comprises an optical frequency conversion device.

12. The nonlinear optical device of claim 11, wherein said crystal of cesium-germanium halide salt is periodically poled to form a quasi-phase matched frequency conversion device.

13. The nonlinear optical device of claim 9, wherein said nonlinear optical medium consists of a crystal of $CsGeCl_3$.

14. The nonlinear optical device of claim 9, wherein said nonlinear optical medium consists of a crystal of $CsGeBr_3$.

15. The nonlinear optical device of claim 9, wherein said nonlinear optical medium consists of a crystal of $CsGeI_3$.

16. An optical frequency conversion device, comprising:

a nonlinear optical medium consisting of a crystal of a cesium-germanium halide salt having the general formula $CsGeCl_xBr_yI_z$, in which x, y, and z each equal a real number from 0 through 3 inclusive, and where $x+y+z=3$;

a light source for generating and directing an input light beam having a pump frequency $\omega_p$ into said cesium-germanium halide salt crystal;

said cesium-germanium halide salt crystal convening said input light beam into a signal beam having a signal frequency $\omega_s$, and an idler beam having an idler frequency $\omega_i$, wherein $\omega_p=\omega_s+\omega_i$.

17. The optical frequency conversion device of claim 16, wherein said cesium-germanium halide salt consists of a crystal of $CsGeCl_3$.

18. The optical frequency conversion device of claim 16, wherein said cesium-germanium halide salt consists of a crystal of $CsGeBr_3$.

19. The optical frequency conversion device of claim 16, wherein said cesium-germanium halide salt consists of a crystal of $CsGeI_3$.

20. The optical frequency conversion device of claim 16, wherein said crystal of cesium-germanium halide salt is periodically poled to form a quasi-phase matched frequency conversion device.

* * * * *